United States Patent [19]
Harris

[11] Patent Number: 6,050,223
[45] Date of Patent: Apr. 18, 2000

[54] LITTER MAT

[76] Inventor: Charles Edward Harris, 3333 Shadow Bluff Ave., Las Vegas, Nev. 89120

[21] Appl. No.: 08/984,901

[22] Filed: Dec. 4, 1997

[51] Int. Cl.⁷ .................................................. A01K 1/035
[52] U.S. Cl. ............................................. 119/165; 15/238
[58] Field of Search .................................... 119/161, 165, 119/168; 15/215, 238; 248/222.13, 231.85, 548

[56] References Cited

U.S. PATENT DOCUMENTS

| | | | |
|---|---|---|---|
| 4,068,339 | 1/1978 | Maruyama et al. | 15/238 X |
| 4,180,890 | 1/1980 | Brumlik . | |
| 4,866,808 | 9/1989 | Zuiddam et al. . | |
| 5,042,430 | 8/1991 | Casmira | 119/165 |
| 5,218,930 | 6/1993 | Casmira | 119/165 |
| 5,220,886 | 6/1993 | Hyde | 119/165 |
| 5,227,214 | 7/1993 | Kerr et al. | 428/95 |
| 5,615,638 | 4/1997 | Thornton | 119/165 |

*Primary Examiner*—Robert P. Swiatek
*Attorney, Agent, or Firm*—Philip J. Anderson; Quick & Tratos

[57] ABSTRACT

A litter mat includes a plurality of flexible plastic strips that have a cross-section in the general shape of an inverted J, are parallel to each other and have similar orientations. The strips are secured to a base. The strips are each in an adjoining relationship with an adjacent strip whereby the strips define a surface disposed above the base. The strips extend lengthwise between two opposite edges of the mat. When a cat steps on the surface the strips or portions thereof flex to space the strips defining passageways for litter to fall to the base. The strips, if desired, may be segmented.

18 Claims, 5 Drawing Sheets

LITTER MAT

FIELD OF INVENTION

This invention relates to mats used to collect litter left by cats when they leave a litter box.

BACKGROUND

When a cat or other animal which uses a litter box leaves the litter box they often track litter from the box to surrounding areas. This is not only unsightly and must be swept up, but also can present a health risk in that the tracked litter is, by necessity, unsanitary.

Attempts have been made to address the above-identified problem. In Casmira, U.S. Pat. Nos. 5,218,930 and 5,042,430 a litter tray apparatus is disclosed which includes a pan covered by a grate disposed at one side of the litter box. However, in this device any litter collected by the pan remains substantially exposed through the grate. Further, the appearance and feel of the grate may cause the cat to simply jump over the pan defeating its intended purpose.

In Thornton, U.S. Pat. No. 5,615,638 a cat litter collection device is shown which includes a litter box surrounded by a carpet covered base unit. According to this device the cat is urged to stand on the base unit and deposit its droppings into the litter box. If the cat were to step into the litter box, litter clinging to its paws would be deposited on the carpet creating the mess and unsanitary situation discussed above.

U.S. Pat. No. 5,220,886 discloses a tray that is covered with a pad having pyramid-shaped protrusions and circular openings. The tray is positioned adjacent to a litter box to cause the cat to step onto the pad. However, as with the other devices discussed above, the openings in the pad provide a constant view of any deposited litter and expose the deposited litter to the air which can carry odors as well as airborne contaminants.

There is a need for a device which is adapted to remove and collect litter which may be carried by the cat as it leaves the litter box, which secures the collected litter from view until disposal and which reduces odor and the opportunity for dispersal of airborne contaminants.

SUMMARY OF THE INVENTION

An object of the present invention is to remove and collect litter and waste products of an animal from its paws when it exits from a litter box.

Another object is to conceal the collected litter and waste products from view and to reduce the spread or odor and contaminants.

According to one specific embodiment of the present invention, a mat is provided which has a flat base provided with a plurality of adjoining, flexible strips arranged in rows, each strip having a cross section in the general shape of an inverted J defined by a wall portion and a curved top portion. A bottom edge of each strip is connected to a base. A plurality of more rigid posts on the base may be spaced along and adjoin each strip to control the flexure of the strips. The top portion of each strip curves to terminate closely adjacent the wall portion of the adjoining strip. The arrangement of the strips and their curved top portions present a substantially continuous, wavy, top surface which is not intimidating to the cat. When the cat steps on the mat leaving the litter box, the weight of the cat flexes the strip(s) or at least the top portions thereof displacing the top portions under the cat's paws away from the adjoining strip opening a passageway for litter from the cat's paw to drop to the base. The weight of the cat on the strips spreads the cat's paws and the pivoting of the top portions also acts to free litter from the paws which falls through the passageway to the base. When the cat's weight is removed, the top portion returns to its original position closing the passageway to conceal the captured litter below on the mat base.

In other embodiments, the strips can have an arrow configuration or a block-letter J configuration. Further, rather than having strips extending continuously across the length of width of the mat, the strips may consist of individual strip segments having the desired configuration and arranged to present a continuous surface for the cat to step upon.

The present invention is useable to form a mat whereon kitty litter and waste products of a cat that are deposited upon the cats paws are collected out of view and may be readily disposed of.

Other objects, features, and advantages of the invention should be apparent from the following description of embodiments thereof as illustrated in the accompanying drawing.

DESCRIPTION OF THE EMBODIMENTS

Figure 1:
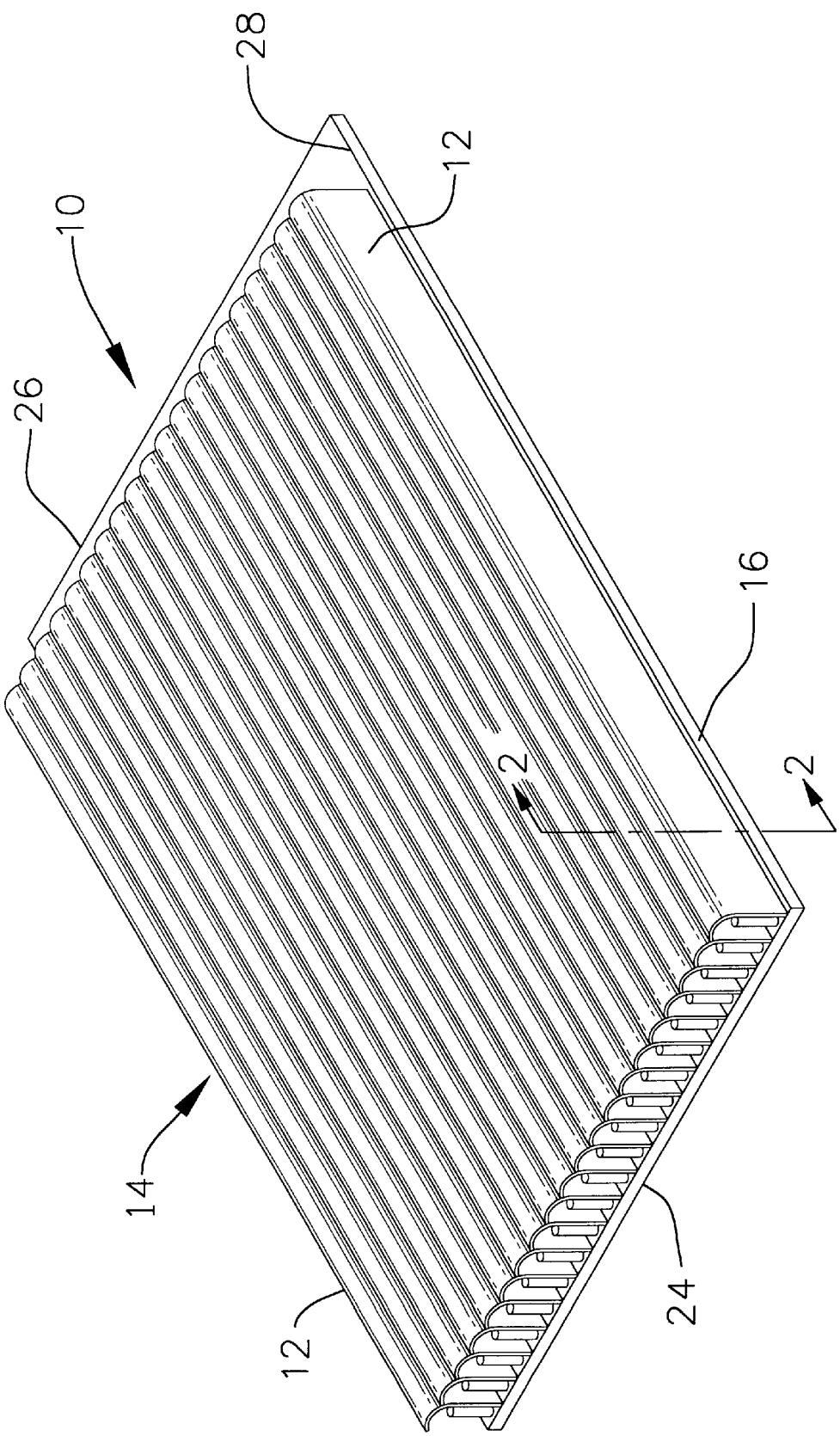
FIG. 1 is a perspective view of the preferred embodiment of the present invention.
Figure 2:
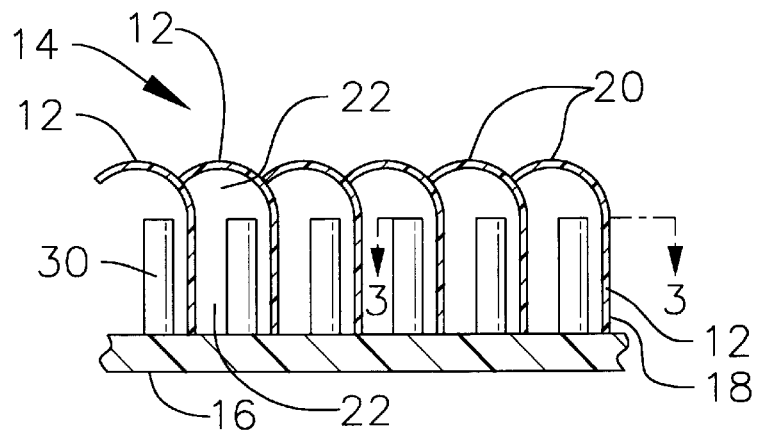
FIG. 2 is a view of FIG. 1 taken along the line 2—2.
Figure 3:
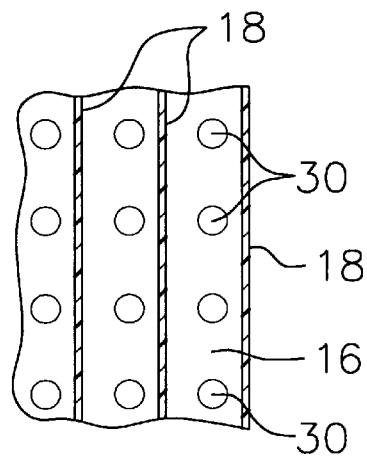
FIG. 3 is a view of FIG. 2 taken along the line 3—3.

As shown in FIGS. 1–3, a litter mat 10 (FIG. 1) includes a plurality of adjacent, flexible plastic strips 12 of similar construction. In the preferred embodiment, strips 12 (FIG. 2) have a cross-section in the general shape of an inverted J, are parallel and adjacent to each other and have similar orientations. Thus, as shown in FIG. 1, the mat presents a substantially continuous, wavy surface 14 for the mat 10.

The mat 10 additionally includes a base 16 which may be rectangular or any other desired shape. The base 16 may be made from either wood, plastic, rubber or any other suitable material and may be rigid or flexible.

The strips 12 each have a wall portion 18 secured to the base 16 by suitable means with the wall portions 18 arranged substantially perpendicular to the base 16 and arranged in rows as shown in FIG. 2.

Because the strips 12 have the cross-section in the shape of the inverted J, defined by the wall portion 18 and a curved top portions 20, the top portions 20 are spaced above and overhang the surface 18. Moreover, the similar orientation and the adjoining relationship between the strips 12 causes the top portion 20 of each strip 12 to closely adjoin or overhang part of the adjacent strip 12 as shown in FIG. 2. Accordingly, the top portions 20 of the strips 12 form an undulated canopy over the base 16. This canopy defines below each top portion 20 adjacent the wall portion 18 for each strip 12 a closed receptacle 22 adapted to receive and retain litter dropped from the surface 14 in the manner described below.

In this embodiment, the strips 12 extend lengthwise between opposite edges 24, 26 of the mat 10. In an alternative embodiment, the strips may be segmented and arranged side-by-side in rows to present the surface 14 shown in FIG. 9.

While FIG. 2 shows the top portions 20 as overlapping, it is to be understood that they could present a space therebetween. That is the top portion 20 of one strip 12 may not project over the wall portion 18 of the adjoining strip 12.

At the edge 24,26 the receptacles 22 are open. At one edge 24,26 if desired, the receptacles may be closed as by a closure 28 that is secured to the base 16.

Each of the strips 12 is elastically deformable about its connection to the base 16 as well as for motion of the top portion 20 relative to the wall portion 18. With reference to FIGS. 2 and 3, to control flexure of the wall portion 18 of the strip 12 cylindrical posts 30 are distributed adjacent and along each wall portion 18 in the receptacle 22. Each post 30 may be of a plastic or rubber material and material similar to that of the strips 12 and is secured to the base 16. Where the materials are the same, to be more rigid than the strip 12, the diameter of the post 30 is greater than the thickness of the wall portion 18. Accordingly, when a downward force is imposed upon the strip top portion 20, the strip 12 flexes and deflects and engages the post(s) 30 whereupon the top portion 20 pivots about the post(s) 30 as suggested in FIG. 7. This response urges the top portion 20 of one strip 12 to separate from the top portion 20 of the adjacent strip 12 to define a passageway 32 for litter to fall into the receptacle 22 below. After the deflecting force is removed, the strip 12 returns to its original position as shown in FIG. 2 closing the receptacle 22. Preferably, the strips 12 and posts 30 are selected such that the aforementioned pivoting action of the strips 12 occurs under the weight of an average cat's paw.

Figure 6:
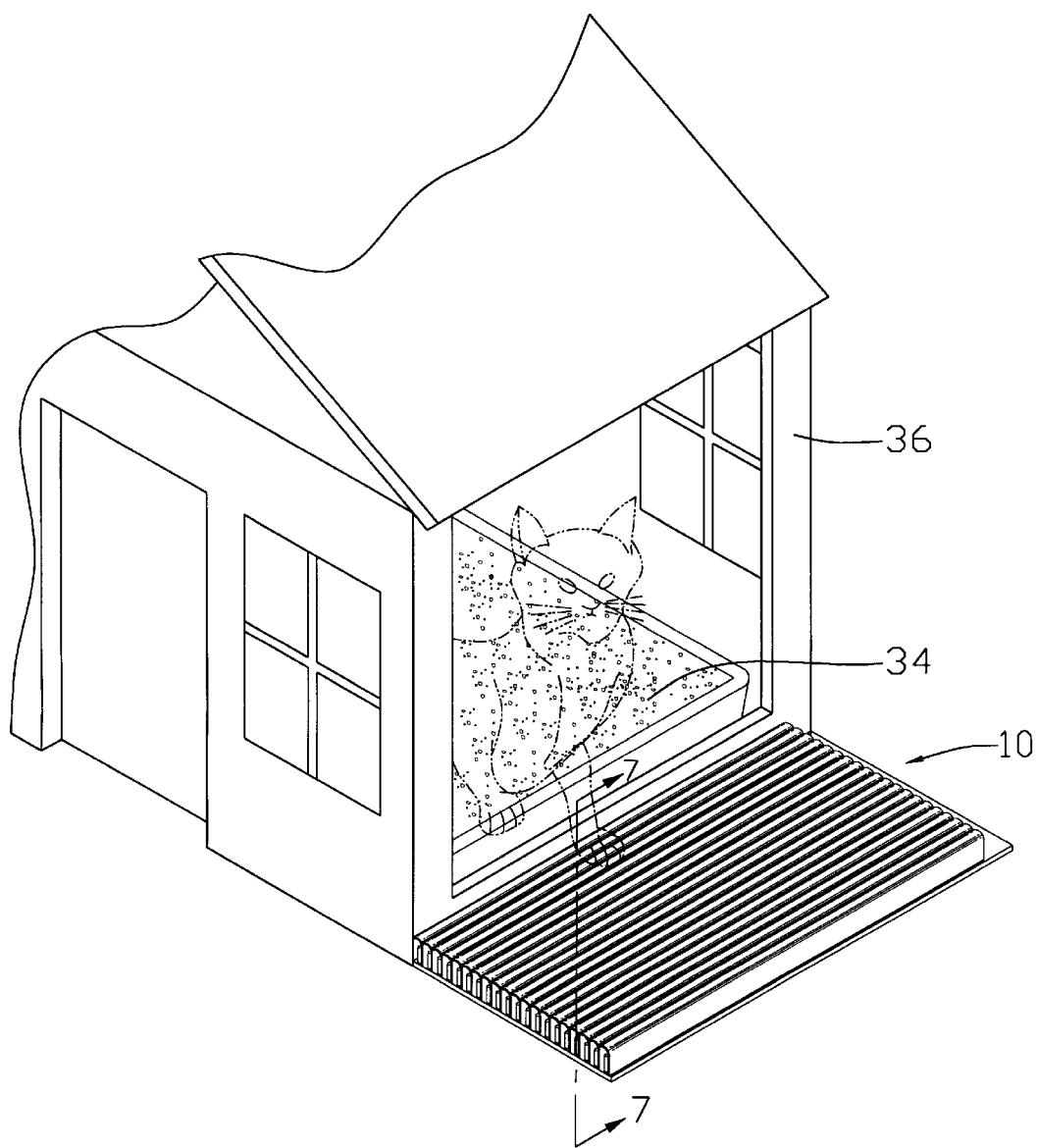
FIG. 6 is a perspective view of a litter mat of FIG. 1 disposed adjacent to a litter box.
Figure 7:
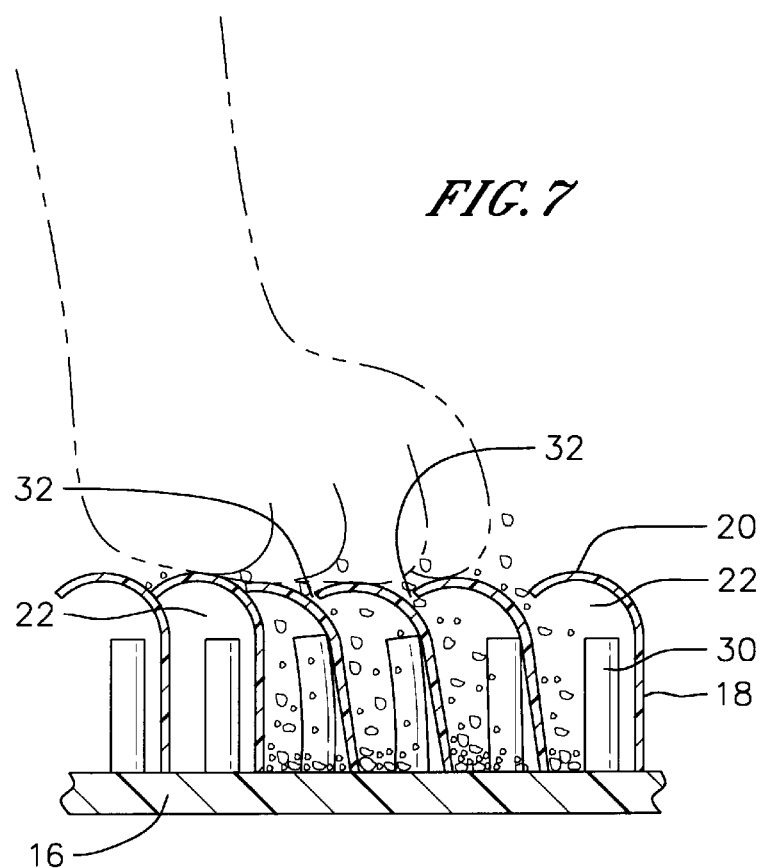
FIG. 7 is an enlarged view of FIG. 6 taken along the line 7—7.

Turning to FIG. 6 the application, use and function of the mat 10 will now be described. The mat 10 is placed adjacent to the cat's litter box 34. A decorative housing 36 may be provided to control the direction in which the cat leaves the litter box 34. Alternatively, the litter box 34 may be positioned in a corner or against a wall and/or multiple mats 10 can be used so that the cat is directed to walk over the mat 10 as it leaves the litter box 34. As shown in FIG. 7 when the cat steps on the mat 10, the strip(s) 12, by virtue of the weight of the cat deflect in the manner illustrated and as described above. Litter retained in the cat's paws drops onto the surface 14 and through the passageways 32 created by deflection of the strip(s) 12 into the receptacles 22 below. Further the shape of the top portions 20 as well as their deflection along with the spreading of the cat's paws when its weight is applied cooperates to remove litter from the paws. When the cat raises its paws, the strips 12 return to their undeflected positions closing the passageways 32 to enclose the dropped litter in the receptacles 22. Enclosing the litter removes it from view and further reduces any odor or contaminants from being carried away from the captured litter.

Figure 8:
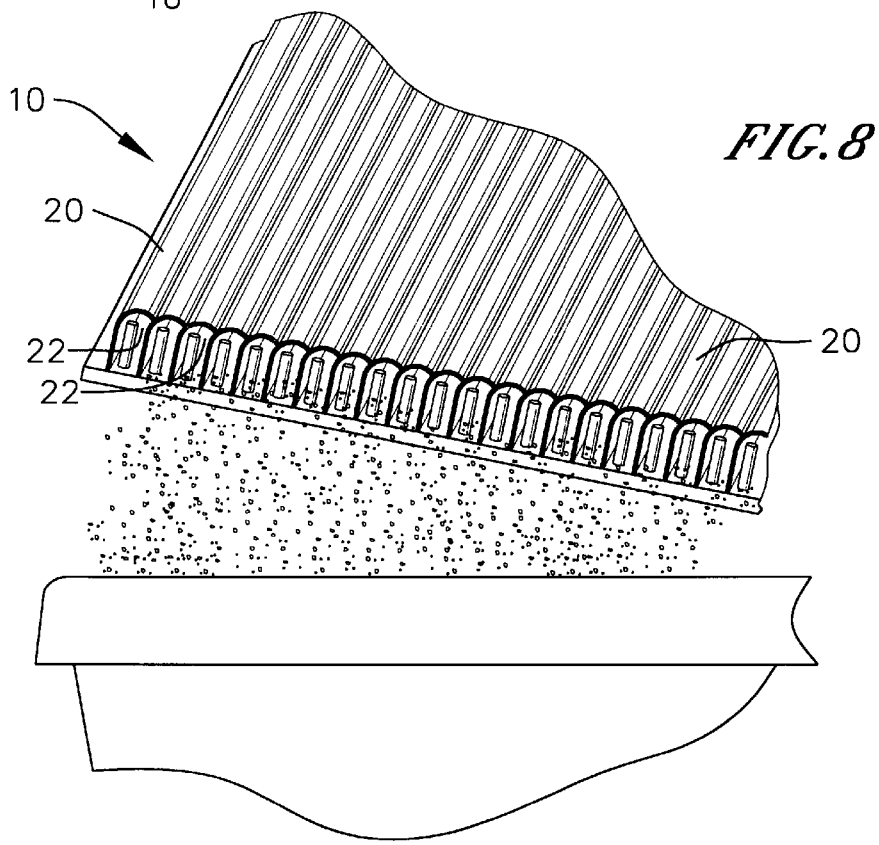
FIG. 8 is a perspective view of the litter mat of FIG. 1 being cleared of a deposition of kitty litter and waste products.

As shown in FIG. 8, the captured litter can easily be removed from the mat 10 by tilting the mat 10 whereupon the litter flows from the receptacles 22 for disposal thereof.

Figure 4:
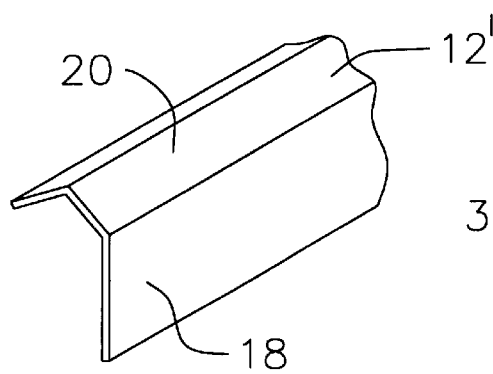
FIG. 4 is a perspective view of a portion of a strip in accordance with one alternative embodiment of the present invention.

As shown in FIG. 4, in one alternate embodiment, a mat 10 includes strips 12' with inverted block-letter J-shaped cross-sections such that the top portions 20 overhang the base 16 and cooperate with wall portions 18 of adjacent strips 12' to form receptacles 22.

Figure 5:
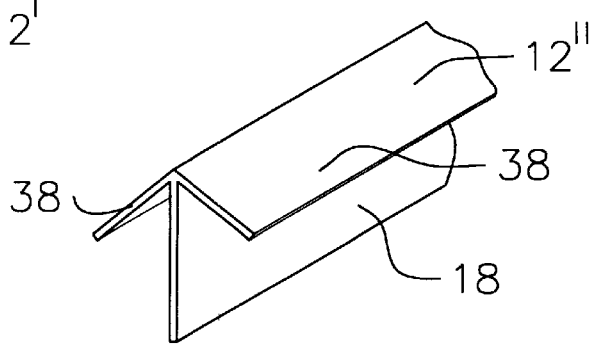
FIG. 5 is a perspective view of a portion of a strip in accordance with another alternative embodiment of the present invention.

As shown in FIG. 5, in yet another embodiment, a mat 10 includes strips 12" with arrow shaped cross-sections such that the wings 38 overhang the base 16 and cooperate with wall portions 18 of adjacent strips 12" to form receptacles 22.

Figure 10:
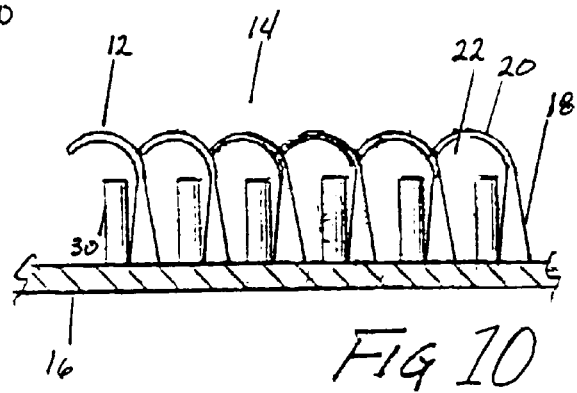
FIG. 10 is a side view of an alternate embodiment of the present invention.

In any of the embodiments described herein posts 30 may be used to control the deflection of the strips 12 and top portions 20 thereof. Alternatively, as shown in FIG. 10, the wall portions 18 may be tapered from the base 26 to focus the deflection to the top portion 20 for the creation of the weight induced opening and closing of the passageways 32.

Alternatively, each strip 12 could be fashioned such that the wall portion 18 is substantially rigid with the top portion 20 adapted to flex in the manner described above.

Figure 9:
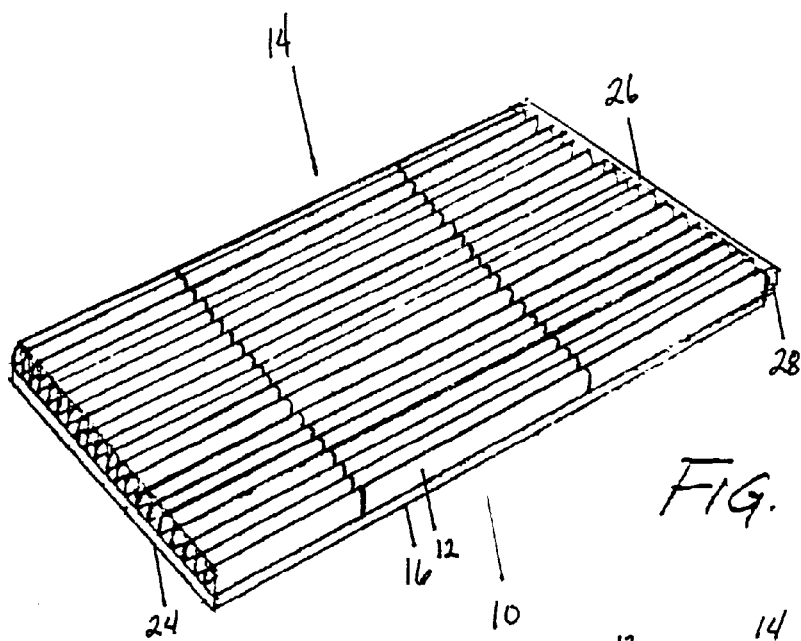
FIG. 9 is a perspective view of an alternate embodiment of the present invention.

Further, as discussed above, in any embodiment, instead of using continuous strips 12, the strips may consist of independent segments as shown in FIG. 9 which together define the surface 14 but which are free to independently deflect in the manner described above.

While the invention has been particularly shown and described with reference to embodiments thereof, it should be understood by those skilled in the art that changes in form and detail may be made therein without departing from the spirit and scope of the invention.

I claim:

1. A litter mat, comprising:
    a base; and
    a plurality of flexible strips each having a wall portion secured to the base and a top portion, the top portions cooperating to define a surface for the mat and a plurality of receptacles, said strips adapted to flex to space said top portions to define passageways for litter to fall into the receptacles to be retained thereby.

2. The litter mat of claim 1 wherein said strips have an inverted J-shaped cross-section.

3. The litter mat of claim 1 wherein said strips have an arrow shaped cross-section.

4. The litter mat of claim 1 additionally comprising a plurality of posts secured to the base adjacent to said strips.

5. The litter mat of claim 4 where said posts have a cylindrical shape with one end connected to said base.

6. The litter mat of claim 4 wherein said posts and said strips are made from similar materials, the diameter of said posts being greater than the thickness of said strips.

7. The litter mat of claim 1 wherein said strips are arranged in column form.

8. The litter mat of claim 1 wherein said strips are segmented.

9. A litter mat comprising:
    a base;
    a plurality of adjacent, flexible strips, each strip including an upstanding wall portion secured to the base and a top portion, said top portions together defining a surface for the mat and a plurality of receptacles there below; and
    means for controlling the flexure of the strips such that they flex under a cat's paw to space said top portions defining a passageway for litter to drop to a receptacle, said top portions closing when the paw is lifted to enclose the dropped litter.

10. The mat of claim 9 wherein each strip has a cross-section of an inverted J.

11. The mat of claim 9 wherein each strip has a cross-section of an inverted block-letter J.

12. The mat of claim 9 wherein each strip has an arrow shape cross-section.

13. The mat of claim 9 wherein the control means includes a post disposed adjacent the wall portion of the strip.

14. The mat of claim 9 wherein the control means includes providing the strip wall portion with a taper.

15. A litter mat comprising:

a base; and a plurality of flexible strip segments each having a wall portion secured to the base and a top portion projecting from the wall portion, said segments arranged on the base such that the top portions define a substantially continuous surface disposed above the base, each segment adapted to flex and separate said top portions under a cat's paw to define a passageway for litter to drop from the surface to the base for collection and retention thereof.

16. The mat of claim 15 wherein the segments are arranged in rows, the wall portions of the segments in each row defining a receptacle for the litter dropped through he passageway.

17. The mat of claim 15 wherein the segment's wall portion and top portion have substantially an inverted J-shape cross-section.

18. The mat of claim 15 wherein the segment's wall and top portions have substantially an arrow shape cross-section.

* * * * *